United States Patent [19]

Carter

[11] Patent Number: 4,752,089
[45] Date of Patent: Jun. 21, 1988

[54] CONNECTOR MEANS PROVIDING FLUID-TIGHT BUT RELATIVELY ROTATABLE JOINT

[75] Inventor: William Carter, Indianapolis, Ind.

[73] Assignee: Puritan-Bennett Corporation, Overland Park, Kans.

[21] Appl. No.: 8,384

[22] Filed: Jan. 29, 1987

[51] Int. Cl.⁴ ............................................. F16L 27/00
[52] U.S. Cl. .................... 285/276; 285/347; 285/349
[58] Field of Search ............... 285/276, 351, 321, 347, 285/349

[56] References Cited

U.S. PATENT DOCUMENTS

| | | | |
|---|---|---|---|
| 3,317,220 | 5/1967 | Bruning | 265/276 X |
| 3,578,361 | 5/1971 | Corrigan | 285/276 X |
| 3,727,950 | 4/1973 | Swanson | 285/276 X |
| 4,294,473 | 10/1981 | Ekman | 285/351 X |
| 4,431,218 | 2/1984 | Paul et al. | 285/351 X |
| 4,475,748 | 10/1984 | Ekman | 285/351 x |
| 4,626,003 | 12/1986 | Williams | 285/276 X |

FOREIGN PATENT DOCUMENTS 716470  8/1965  Canada ........................... 285/276

Primary Examiner—Dave W. Arola
Attorney, Agent, or Firm—Robert A. Spray

[57] ABSTRACT

A connector means which provides a fluid-tight seal, but with relative rotation of a pair of body members of a hydraulic line or device. Cylindrical extensions on both the body members, which interfit in assembly, have circumferential grooves facing one another and receive ball bearing members in the circumferential chamber provided by the grooves; and the arrangement is such that the bearing members act to block axial withdrawal of the body members from a tight sealing engagement with an O-ring which assures fluid-tightness of the joint even though the body members are relatively rotatable.

24 Claims, 1 Drawing Sheet

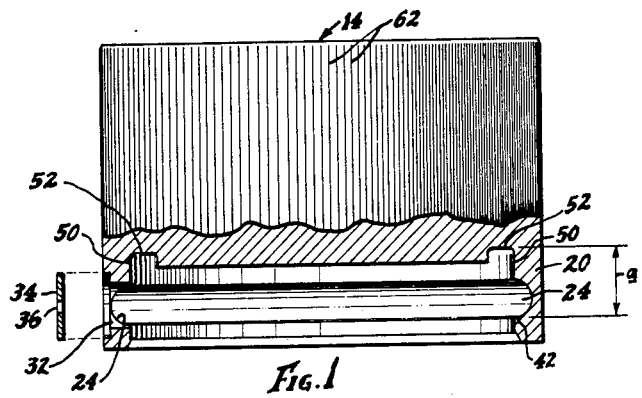
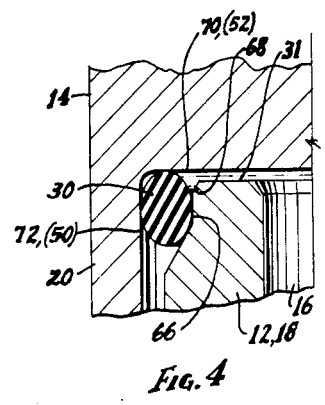
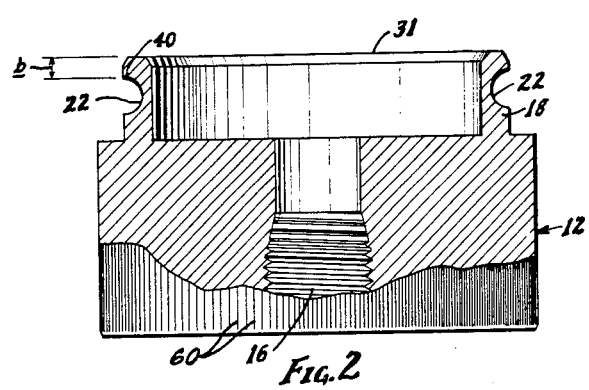
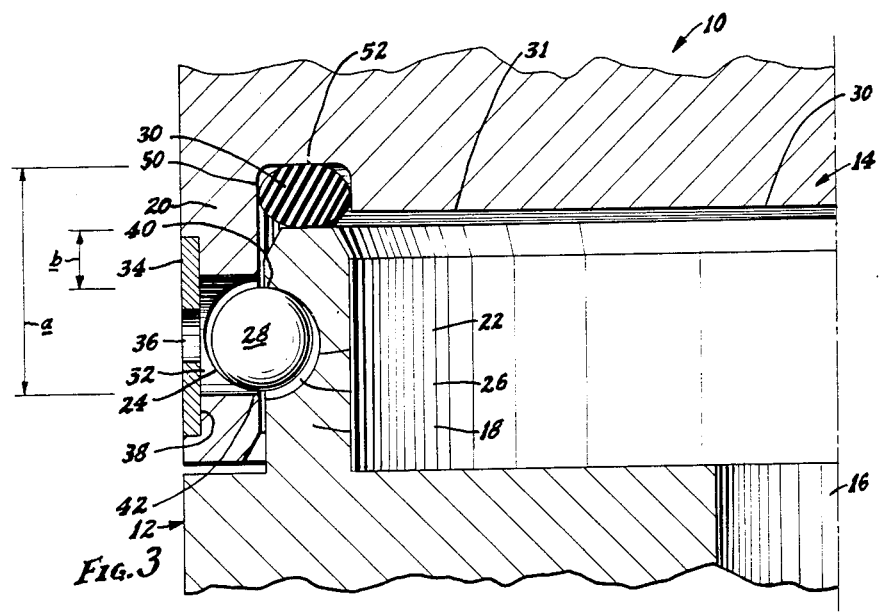

CONNECTOR MEANS PROVIDING FLUID-TIGHT BUT RELATIVELY ROTATABLE JOINT

FIELD AND NATURE OF THE INVENTION

This invention relates to a connection means for two conduits or other hydraulic device bodies which are to be connected in a relatively rotatable manner even though fixed axially with respect to one another.

More particularly, the invention relates to and provides a connector means for providing a fluid-tight seal but also the relative rotation of a pair of bodies, in whatever may be the use of the bodies, and with whatever may be the utility of the bodies or of the pressurized fluid carried by the bodies.

Accordingly, the connection concepts may be utilized in any sort of a swivel joint of any hydraulic line, or for interconnecting relatively rotatable bodies of certain regulator devices, or for other uses of these natures requiring fluid-tightness but relative rotatability.

At least one of the body members would presumably be supplied with fluid, under some pressure, but whether there would be flow or no flow of the fluid, and whether the other body member will carry the fluid or just be a line-closing cap, are not factors which limit the usability of the connector concepts of the invention; and, indeed, the concepts are herein illustrated with one body containing pressurized fluid and the other merely a rotatable cap.

THE INVENTIVE CONCEPTS, SUMMARIZED

Each of the bodies to be rotatably connected is provided with a cylindrical extension, one of which is rotatably received in the cylindrical extension of the other body of the connection. Each of those extensions are provided with an annular groove, the grooves facing one another and providing an annular chamber into which are placed a circumferential series of bearing members. A sealing ring, preferably an O-ring, is concentric with the axis of rotation, and it seals between the extension of one body member, and the other body member or its extension.

In such an assembly, and with the groove walls providing oppositely facing abutments engaged by the bearing members, and with the groove of one body being located a specific distance from the O-ring, and with the groove of the other body being located a related distance from the wall of its extension which seals against the O-ring, the series of bearing members act to provide a circumferential abutment means blocking axial movement body members axially away from one another, and urging them axially toward one another, thus assuring a fluid-tight seal in spite of the relative rotation.

BRIEF DESCRIPTION OF THE DRAWINGS

The above description is of somewhat introductory and generalized form. More particular details, concepts, and features are set forth in the following and more detailed description of illustrative embodiments of the invention, taken in conjunction with the accompanying drawings, which are of somewhat schematic and diagrammatic nature for illustrating the inventive concepts, as well as illustrating the ease and convenience of assembly of adjacent parts by which the fluid-tight joint is achieved even though they are relatively rotatable.

FIG. 1 is an elevation view, partly in axial cross-section, of one of the body members to be joined, with connector means of a first embodiment shown integrally extending therefrom, for the invention's concepts to provide a fluid-tight seal yet also their relative rotatability, this FIG. 1 also showing, in the nature of a so-called "exploded view," a retainer cap member to retain an assembly of ball bearing members (shown in FIG. 3) and thus also the assembly of the body member of FIG. 1 and the body member of FIG. 2;

FIG. 2 is an elevation view similar to FIG. 1, partly in axial cross-section, of the other of the body members to be joined, also showing integral connector means extending therefrom, by which the body members are rotatably joined in a fluid-tight manner, this FIG. 2 being shown in the same scale as FIG. 1 and in projected alignment therewith, as the body members of FIG. 1 and FIG. 2 would be prior to their assembly;

FIG. 3, in greatly enlarged scale in comparison to FIGS. 1 and 2, is a axial cross-sectional detail view illustrating the assembly of the body members and connector means of FIGS. 1 and 2, this view also showing one of the ring of ball bearing members in its position of final assembly and operative to maintain a fluid-tight connection of the joint, and with the retainer cap of FIG. 1 also in assembled position, and FIG. 4 is a fragmental detail view, in axial cross-section, illustrating a second embodiment connector means in which the sealing force or pressure is generally radially outwardly in contrast to being generally axially in the first embodiment.

DETAILED DESCRIPTION OF A PREFERRED EMBODIMENT

As shown in the drawings, the present invention provides an advantageous connector means 10 useful for providing both a fluid-tight seal and a relative rotation of whatever is a pair of adjacent members here shown as members 12 and 14.

Here, such members are illustrated by what are simply referred to as a first body member 12 and a second body member 14; and for ease of illustration and understanding of the connector concepts, the first body member 12 is shown merely as a conduit body having a bore 16 which might contain any gas or liquid, and the second body member is shown merely as a closure cap 14 for the first body member 12 and its bore 16, although in other usess the second body member 14 would also have a bore (not here shown) for whatever is to be the transmission of the gas or liquid here indicated merely as supplied to the bore 16.

Presumably the fluid in the bore 16 is under pressure, but as described below the connector concepts here specified for the connector 10 maintain a fluid-tight seal regardless of the pressure, and nevertheless permit relative rotation of the body members 12 and 14.

As shown, each of the body members 12 and 14, at their adjacent ends, is provided with an operatively cylindrical extension; i.e., as here shown the first body member 12 is provided with an operatively cylindrical extension 18, and the second body member 14 is provided with an operatively cylindrical extension 20, and the cylindrical extension 18 of the first body member 12 is rotatably received in the cylindrical extension 20 of the second body member 14. These are shown as assembled in the detail view of FIG. 3, the cylindrical extension 18 of the first body member 12 being in the nature of a male member of the connection, and the cylindrical extension 20 of the second body member 14 being in the nature of a female member of the connection.

Along their adjacent cylindrical faces, the cylindrical extension 18 of the first body member 12 and the cylindrical extension 20 of the second body member 14 are shown as provided with annular groove means facing one another; and these groove means, which are referred to herein as groove means 22 for the cylindrical extension 18 of the first body member 12 and as groove means 24 for the cylindrical extension 20 of the second member 14, co-operate to provide an annular chamber 26 for a series of bearing member 28 which are here shown as bearing balls 28 carried in the co-operating two annular groove means 22 and 24.

As noted in FIG. 3, the series of ball bearing members 28 provides in effect a circumferential abutment means which blocks axial movement of the first body member 12 and the second body member 14 axially away from one another, and urges the first body member 12 and the second body member 14 axially toward one another for the sealing operativity specified herein.

Further as shown, there is provided a circumferential sealing means, here shown as an O-ring 30, operatively between the cylindrical extension 18 of the first body member 12 and the second body member 14, and that extension 18 and the second body member 14 are operatively abuttingly engageable through the O-ring sealing means 30.

The effect of the bearing members 28 in the chamber 30, as shown in the assembly view of FIG. 3, is there seen as an operativity of urging the first body member 12 and the second body member 14 axially toward one another; and this accordingly acts to urge the O-ring sealing means 30 to achieve the fluid-tight fit, and thus operatively of a fluid-tight joint, between the first body member 12 and the second body member 14, even though they are relatively rotatable.

The relative position of the parts, i.e., in this embodiment the relative position of the O-ring 30 and the groove 24, and the position of the outer end 31 of the cylindrical extension 18 of the first body member 12 relative to the groove 22, is (FIG. 3) desirably such that some force (even though perhaps slight) must be imparted to the first body member 12 and the second body member 14, axially toward one another, to achieve proper axial alignment of the grooves 22/24 to accommodate entry of the balls 28; and this assures a snug and fluid-tight sealing effect of the O-ring 30 against the outer end wall 31 of the cylindrical extension 18 of the first body member 12, by a compression of the O-ring 30 achieved and maintained by the presence of the bearing members 28 in the chamber 26.

More particularly as shown, the annular groove means 22 of the first body member 12's extension 18 is noted as radially outwardly facing, and the annular groove means 24 of the second body member 14 is radially inwardly facing, and as such they thereby provide their co-operativity of providing the annular chamber 26 for the series of bearing members 28.

Assembly of the bearings 28 into the assembly of first body member 12 and second body member 14 is accommodated as shown by the cylindrical extension 20 of the second body member 14 being provided with a radially-directed opening means 32 adapted to receive individual ones of the bearing balls 28 if the body members 12 and 14 have been pushed together far enough to sufficiently compress the seal 30 to align the grooves 22/24 thus accommodating through the hole 32 the ball members 28 for their assembly into the annular groove means 22/24 of chamber 26; and the opening means 32 is provided with a cap means 34 for blocking the travel of the bearing ball members 28 outwardly of their position in the chamber 26 provided by the annular groove means 22/24.

The cap 34 is shown as desirably provided with a small radial hole 36, for ease of handling, lubrication, etc.; and the cylindrical extension 20 of the second body member 14, which has the wall hole 32 and the cap 34, is shown recessed in its outer wall, as at 38, for accommodating the cap 34, of course generally concentric with the wall hole 32.

The assembly view of FIG. 3 illustrates the force-sustaining operativity achieved here by the co-operating groove means 22/24. More particularly, as there shown, the wall 40 of the groove means 22 of the cylindrical extension 18 of the first body member 12 (which wall 40 is the wall thereof which is adjacent the second body member 14 and is non-adjacent the first body member 12), and the wall 42 of the groove means 24 of the cylindrical extension 20 of the second body member 14 (which wall 42 is the wall thereof which is adjacent the first body member 12 and non-adjacent the second body member 14) are operative to co-operate abuttingly, respectively, with the series of bearing members 28, to sustain the force of engagement of the cylindrical extension 18 of the first body member 12 with the sealing means 30, and to transmit that force through those groove means walls 40/42 and through the ball bearing members 28 to cause that force to be sustained by the said second body member 14, thus blocking axial movement of the first body member 12 and the second body member 14 away from one another and urging the first body member 12 and the second body member 14 axially toward one another, assuring the fluid-tight nature of the relatively rotatable connection 10.

Diagrammatically this is shown, in FIG. 3, by the dimension "a" (between portions 52 and 42) being slightly less than total of the dimension "b" (between portions 40 and 31) plus the unstressed or at-rest diameter of the cross-section of the stock of the O-ring 30 and the diameter of the bearing balls 28.

In this embodiment (FIG. 3) the cylindrical extension 20 of the second body member 14 provides the extra function of providing a radially inwardly facing wall means 50 which provides a locator for the O-ring 30; and the second body member 14 is provided also with a groove means 52 axially opening toward the first body members 12 and its end wall 31, which groove 52 provides a locator seat for the O-ring 30.

Knurling is shown at 60 and 62, respectively, of body members 12 and 14, to schematically indicate imposition of external torque effort applicable to relatively rotate the body members 12 and 14, causing the special need of sealing them by fluid-tight means, as herein shown.

With further reference to the achievement of the force-sustaining which assures a sufficient force or pressure to achieve the fluid-tight seal at O-ring 30, it is to be noted that the cylindrical extension 18 of the first body member 12 and the cylindrical extension 20 of the second body member 14 are shown, as an effect of their respective grooves 22 and 24, as being provided with abutment means facing in opposite axial directions; i.e., the abutment means 40 of the cylindrical extension 18 of the first body member 12 facing the first body member 12 and away from the second body member 14, and the abutment means 42 of the cylindrical extension 20 of the second body member 14 facing the second body member 14 and away from the first body member 12. And the series of bearing members 28 thus provides a circumferential abutment means abuttingly co-operating with those two abutment means 40/42 for their aforesaid blocking of axial movement of the first body member 12 and the second body member 14 axially away from one another, and their urging of the first body member 12 and the second body member 14 axially toward one another.

Thus it is that when the first body member 12 and the second body member 14 are assembled as herein specified, with the cylindrical extension 18 of the first body member 12 received in the cylindrical extension 20 of the second body member 14, and the bearing members 28 are assembled to be in their carried position in the grooves 22/24 of chamber 26, that the abutment means 40 of the cylindrical extension 18 of the first body member 12 and the abutment means 42 of the cylindrical extension 20 of the second body member 14 co-operate abuttingly respectively with the series of bearing members 28 to sustain the force of abutting engagement of the cylindrical extension 18 of the first body member 12 with the O-ring sealing means 30, and to transmit that force through the two abutment means 40/42 and through the ball bearing members 28 to cause that force to be sustained by the second body member 14, with the effects already mentioned.

A variation is shown by the detail of FIG. 4, with primarily radial abutment of the O-ring 30 in contrast to primarily axial abutment thereof as in the embodiment of FIG. 3. As shown in FIG. 4, the outer wall 66 of the cylindrical extension 18 of the first body member 12 is champhered as at 68 to provide in effect a conical camming surface, co-operative with the rounded contour of the O-ring 30, to achieve the camming effect.

Also, in FIG. 4, it is noted that the second body member 14 is provided with a wall means 70 axially facing the first body member 12, and the cylindrical extension 20 provides a wall means 72 facing radially inwardly, thus providing a locator seat for the O-ring 30; and the wall 66/68 of the cylindrical extension 18 of the first body member 12 provides a portion which is radially inwardly of the O-ring 30 when the O-ring 30 is so seated but which is caused, by the presence of the bearing members 28 in the chamber 26 of grooves 22/24, to be positioned axially in operatively axial alignment with the O-ring 30, when the O-ring 30 is seated as specified above against walls 70/72. (Wall means 70 of the FIG. 4 embodiment corresponds to the wall means 52 of the FIG. 3 embodiment; and, likeiwse, wall means 72 corresponds to the wall means 50.)

Thus, in FIG. 4, there is achieved an outwardly or generally radial camming operativity of walls 66/68 against the O-ring 30, thus achieving a radially-outward compressive sealing of the O-ring 30 against the radially inwardly facing wall 72 of the second body member 14.

Such radial pressure against the O-ring 30, with what axial pressure is thus caused also to exist between the O-ring 30 and the wall-seat 70, thereby achieves a fluid-tight seal, yet, as also in the embodiment of FIG. 3, permits relative rotation of the first body member 12 and the second body member 14.

As an extra advantage of the concepts, a general control of the relative rotatability of the bodies 12 and 14 is achieved, by the snubbing or frictional effect of the seal 30 against the wall 31 (FIG. 3) or the walls 66/68 (FIG. 4).

That is, by the provision of the parts such that the dimension "a" is short enough compared to that of "b" plus the effective diameter of the balls 28 and the stock of the O-ring 30, the frictional snubbing by the seal 30 can be controlled, to be of various tightnesses, even so tight that only great relative torque applied to the bodies 12/14 would effect their rotation.

Thus a specifically-desired orientation of the bodies 12/14 of the joint may be maintained, as against vibration or other possible causes of change of position.

Conversely, since the seal of the sealing body 30 is effectively against not merely one wall but adjacent walls, a very tight nature in this respect is usually not necessary to maintain fluid-tightness against even high pressures.

CONCLUSION

It is thus seen that a connector means, constructed and used according to the inventive concepts herein set forth, provides novel concepts of a desirable and advantageous device, yielding the advantages of a fluid-tight joint even though the connected bodies are relatively rotatable. Axial holding of the bodies is also a nature of the joint achieved by these concepts; and assembly is quite convenient.

Accordingly, it will thus be seen from the foregoing description of the invention according to these illustrative embodiments, considered with the accompanying drawings, that the present invention provides new and useful concepts of a novel and advantageous connector device, having and yielding desired advantages and characteristics in construction and use, and accomplishing the intended objects, including those hereinbefore pointed out and others which are inherent in the invention.

Modifications and variations may be effected without departing from the scope of the novel concepts of the invention; accordingly, the invention is not limited to the specific embodiments, or form or arrangement of parts herein described or shown.

For example, although the sealing ring 30 is referred to as an O-ring, no precise circularity of cross-section is implied; and a ring body 30 whose cross-section is larger radially than axially may be preferred in the embodiment of FIG. 3, whereas a ring 30 whose cross section is larger axially than radially may be preferred in the embodiment of FIG. 4, even though both may be called O-rings. Further, the term O-ring for the seals 30 is to be considered in its broad sense, of any sort or nature of a seal having an operative disk-shape or ring shape, regardless of the geometric shape of its cross-section or of the constituents of the seal body. Thus, for illustration and not limitation, seals of a U-shape or C-shape, with or without internal coils or stiffeners, and regardless of surface nature, illustrate the broad scope of varieties, even though for illustration of the concepts there is here shown merely solid core rings of almost circular cross-section. The other types of seal rings are commercially available, such as from Advanced Products Company, 33 Defco Park Road, North Haven, Conn. 06473, Telephone (203) 239-3341; Bal Seal Engineering Company, 620 W. Warner Ave., Santa Ana, Calif. 92707, Telephone (714) 557-5192 or 545-1006; and Fluorocarbon Mechanical Seal Division, 10871 Kyle St., P.O. Box 520, Los Alamitos, Calif. 90720, Telephone (213) 594-0941.

Also, although the sealing engagement against and by the sealing ring 30 is specified in the embodiments by terms such as "axial" and "radial", that is done to emphasize particulars of engagement in the embodiments, for in both embodiments there would of course be some of both types as the O-ring 30 is compressed in the sealing operativity here achieved.

Further, although the abutment achieved by the balls 28 as interposed between the walls 40/42 of grooves 22/24 is operatively circumferential by a ring-like series of the balls 28, the circumferential nature or quantity of balls 28 is not intended to be implied as requiring a full 360 ball-to-ball or zero-spaced engagement of balls 28.

I claim:

1. A connector means for providing a fluid-tight seal and relative rotation of a pair of adjacent first and second body members, comprising, in combination:

providing the first body member with an operatively cylindrical extension, providing the second body member with an operatively cylindrical extension, the cylindrical extension of the first body member being rotatably received in the cylindrical extension of the second body member, the cylindrical extension of the first body member and the cylindrical extension of the second body member being provided with annular groove means facing one another, and co-operating to provide an annular chamber for bearing members specified below, a series of bearing members carried in the co-operating two said annular groove means, and the series of bearing members providing a circumferential abutment means blocking axial movement of the first body member and second body member axially away from one another, and urging the first body member and the second body member axially toward one another, there being provided circumferential sealing means operatively between the cylindrical extension of the first body member and the second body member, they being operatively engageable through the said sealing means, the two said annular groove means being at least slightly out of alignment so that said bearing members are constantly urging the first body member and the second body member axially toward one another thus acting to compress and urge the sealing means to achieve a fluid-tight fit between the first body member and the second body member even though they are relatively rotatable, in a combination in which the wall of the annular groove means of the cylindrical extension of the second body member is of an operatively rigid nature blocking radially outward movement of the bearing members which could release their said axial movement-blocking operativity as to the first and second body members, regardless of any force tending to force the bearing members outwardly, which is imposed upon the cylindrical extension of the first body member by compressive force in the circumferential sealing means, and thereby preventing any disconnection of the first and second body members without removal of the bearing members from the two said groove means.

2. The invention as set forth in claim 1, in which the sealing means is an O-ring.

3. The invention as set forth in claim 2, in which the cylindrical extension of the second body member provides also a radially inwardly facing wall means which provides a locator for the O-ring.

4. The invention as set forth in claim 2, in which the second body member is provided with a cylindrical wall means which provides a locator for the O-ring.

5. The invention as set forth in claim 2, in which at least one of the first body member and second body member is provided also with a groove means axially opening toward the other of said body members, which provides a locator seat for the O-ring.

6. The invention as set forth in claim 5, in which it is the second body member which is provided with the axially opening groove means.

7. The invention as set forth in claim 2, in which the second body member is provided with a wall means facing the first body member and a wall means facing radially inwardly, thus providing a locator seat for the O-ring, and the cylindrical extension of the first body member is provided with a portion which is radially inwardly of the O-ring when so seated but which is caused, by the presence of the bearing members in the said chamber, to be positioned axially in operatively axial alignment with the O-ring when the O-ring is seated as specified above, and the inner wall of the O-ring and the outer wall of the said portion of the first body member's cylindrical extension are shaped to co-operatively achieve an outwardly camming operativity of the said portion against the O-ring, thus achieving a radially-outward compression sealing of the O-ring against the said radially inwardly facing wall means of the second body member, thereby achieving a fluid-tight seal yet permitting relative rotation of the first body member and the second body member.

8. The invention as set forth in claim 1, in which the bearing members are ball bearing balls.

9. The invention as set forth in claim 1, in which the annular groove means of the first body member is radially outwardly facing, and the annular groove means of the second body member is radially inwardly facing, thereby providing their co-operatively as aforesaid of providing an annular chamber for the bearing members.

10. The invention as set forth in claim 1, in which the cylindrical extension of the second body member is provided with an opening means adapted to receive individual ones of the bearing members for their assembly into the annular groove means as aforesaid.

11. The invention as set forth in claim 10, in which the opening means is provided with a cap means for blocking the travel of the bearing members outwardly of their position in the chamber provided by the annular groove means.

12. The invention as set forth in claim 1, in which
   (a) the wall of the groove means of the cylindrical extension of the first body member, which is the wall thereof which is adjacent the second body member and non-adjacent the first body member, and
   (b) the wall of the groove means of the cylindrical extension of the second body member, which is the wall thereof which is adjacent the first body member and non-adjacent the second body member,
   co-operate abuttingly respectively with the series of bearing members, to sustain the force of engagement of the cylindrical extension of the first body member with the sealing means, and to transmit that force through said groove means walls and through said bearing members to cause that force to be sustained by the said second body member, thus blocking axial movement of the first body member and the second body member away from one another and urging the first body member and the second body member axially toward one another.

13. The invention as set forth in claim 1, in a combination in which, with respect to the groove means of the first body member, its portion adjacent the said circumferential sealing means is at least substantially radial, thus providing that axial force in the said circumferential sealing means can act upon the bearing members with only generally axial components, and with at most only minimal radial components which would urge the bearing members radially against the wall of the groove means of the cylindrical extension of the second body member.

14. A connector means for providing a fluid-tight seal and relative rotation of a pair of adjacent first and second body members, comprising, in combination:

providing the first body member with an operatively cylindrical extension, providing the second body member with an operatively cylindrical extension, the cylindrical extension of the first body member being rotatably received in the cylindrical extension of the second body member, the cylindrical extension of the first body member and the cylindrical extension of the second body member being provided with abutment means facing in opposite axial directions, the abutment means of the cylindrical extension of the first body member facing the first body member and away from the second body member, the abutment means of the cylindrical extension of the second body member facing the second body member and away from the first body member, a series of bearing members carried between the said abutment means of the cylindrical extension of the first body member and the abutment means of the cylindrical extension of the second body member, the series of bearing members providing a circumferential abutment means abuttingly co-operating with the said two abutment means for blocking axial movement of the first body member and second body member axially away from one another, and urging the first body member and the second body member axially toward one another, there being provided circumferential sealing means operatively between the cylindrical extension of the first body member and the second body member, they being operatively engageable through the said sealing means, the first and second body members and their respective cylindrical extensions being formed to provide that the axial length (a) between the seat of the second body member against which seat the sealing means seats, to the said abutment means of the cylindrical extension of the said second body member, minus the diameter of the bearing members, and also minus the length (b) between the wall of the first body member which engages the sealing means and the said abutment means of the cylindrical extension of the said first body member, is less than the non-compressed axial length of the sealing means, thereby providing that with the said first body member and the second body member and the bearing members assembled as aforesaid, the presence of the bearing members causes the sealing means to be compressed, thus acting to urge the sealing means to achieve a fluid-tight seal between the first body member and the second body member even though they are relatively rotatable, and thereby providing, when the first body member and the second body member are assembled as aforesaid, with the cylindrical extension of the first body member received in the cylindrical extension of the second body member, and the bearing members are assembled to be in their carried position as aforesaid, that the said abutment means of the cylindrical extension of the first body member and the said abutment means of the cylindrical extension of the second body member co-operate abuttingly respectively with the series of bearing members, to sustain the force of engagement of the cylindrical extension of the first body member with the sealing means, and to transmit that force through said two abutment means and through said bearing members to cause that force to be sustained by the said second body member, thus blocking axial movement of the first body member and the second body member away from one another and urging the first body member and the second body member axially toward one another, in a combination in which the second body member is provided to have an operatively rigid wall circumferentially surrounding the cylindrical extension of the first body member radially outwardly of the location therealong in which the said bearing members are disposed when in their position of abutting co-operation with the said two abutment means, the said rigid wall being operative to block radially outward movement of the bearin members which could release their said axial movement-blocking operativity as to the first and second body members, regardless of any force tending to force the bearing members outwardly, which is imposed upon the cylindrical extension of the first body member by compressive force in the circumferential sealing means, and thereby preventing any disassembly of the first and second body members without removal of the bearing members from their position of abutting co-operation with the said two abutment means.

15. The invention as set forth in claim 14, in which sealing means is an O-ring.

16. The invention as set forth in claim 15, in which the cylindrical extension of the second body member provides also a radially inwardly facing wall means which provides a locator for the O-ring.

17. The invention as set forth in claim 15, in which the second body member is provided with a cylindrical wall means which provides a locator for the O-ring.

18. The invention as set forth in claim 15, in which at least one of the first body member and second body member is provided also with a groove means axially opening toward the other of said body members, which provides a locator seat for the O-ring.

19. The invention as set forth in claim 18, in which it is the second body member which is provided with the axially opening groove means.

20. The invention as set forth in claim 15, in which the second body member is provided with a wall means facing the first body member and a wall means facing radially inwardly, thus providing a locator seat for the O-ring.

and the cylindrical extension of the first body member is provided with a portion which is radially inwardly of the O-ring when so seated but which is caused, by the presence of the bearing members between the said abutment means of the cylindrical extension of the first body member and the abutment means of the cylindrical extension of the second body member, to be positioned axially in operatively axial alignment with the O-ring when the O-ring is seated as specified above, and the inner wall of the O-ring and the outer wall of the said portion of the first body member's cylindrical extension are shaped to co-operatively achieve an outwardly camming operativity of the said portion against the O-ring, thus achieving a radially-outward compressive sealing of the O-ring against the said radially inwardly facing wall means of the second body member, thereby achieving a fluid-tight seal yet permitting relative rotation of the first body member and the second body member.

21. The invention as set forth in claim 14, in which the bearing members are ball bearing balls.

22. The invention as set forth in claim 14, in which the cylindrical extension of the second body member is provided with an opening means adapted to receive individual ones of the bearing members for their assembly into their carried position as aforesaid, in which they abuttingly co-operate as aforesaid.

23. The invention as set forth in claim 22, in which the opening means is provided with a cap means for blocking the travel of the bearing members outwardly of their carried position in which they abuttingly co-operate as aforesaid.

24. The invention as set forth in claim 14, in a combination in which, with respect to the said abutment means of the cylindrical extension of the first body member, which faces the first body member and away from the second body member, that said abutment means is at least substantially radial, thus providing that axial force imposed by compressive force in the said circumferential sealing means can act upon the bearing members with only generally axial components, and with at most only minimal radial components which would urge the bearing members against the said circumferentially surrounding wall.

* * * * *